G. A. SQUIER.
EYEGLASS MOUNTING.
APPLICATION FILED NOV. 18, 1909.
1,003,539.
Patented Sept. 19, 1911.
Fig. 1.
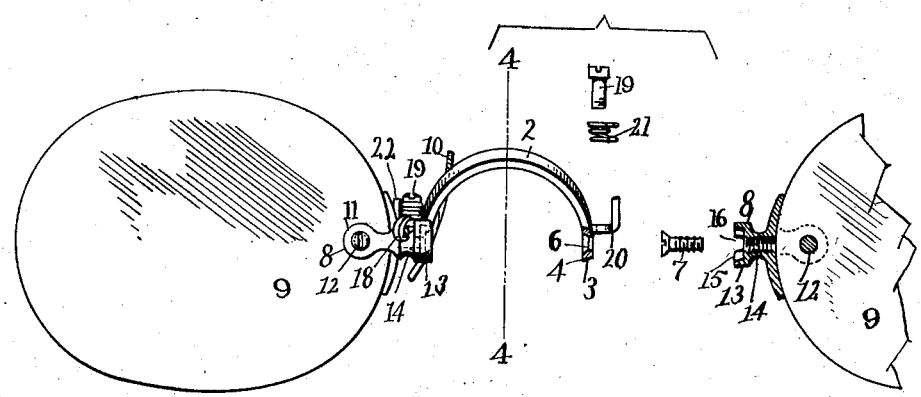
Fig. 2.
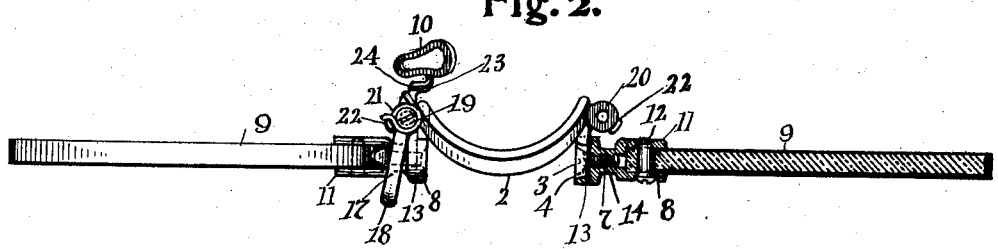
Fig. 3.
Fig. 4.
Fig. 5.
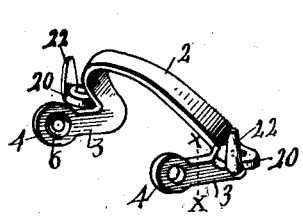
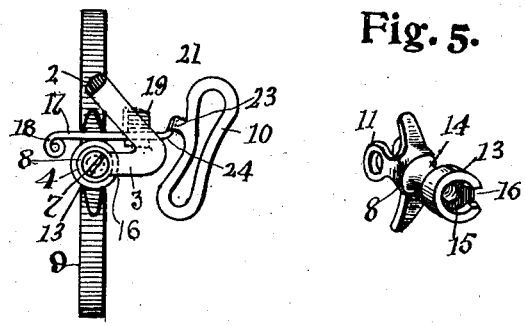
Fig. 6.
ATTEST
E. M. Fisher
J. C. Musser.
INVENTOR
George A. Squier
BY Fisher + Moser ATTYS.

UNITED STATES PATENT OFFICE.

GEORGE A. SQUIER, OF CLEVELAND, OHIO.

EYEGLASS-MOUNTING.

1,003,539.

Specification of Letters Patent.  Patented Sept. 19, 1911.

Application filed November 18, 1909. Serial No. 528,648.

*To all whom it may concern:*

Be it known that I, GEORGE A. SQUIER, citizen of the United States, residing at Cleveland, in the county of Cuyahoga and State of Ohio, have invented certain new and useful Improvements in Eyeglass-Mountings, of which the following is a specification.

My invention is an improvement in eyeglass mountings and particularly in the mounting covered by my application for Letters Patent of the United States filed June 17, 1908, Ser. No. 500,506, and the improvement consists in a construction and combination of parts substantially as herein shown and described and more particularly pointed out in the claims.

My improved mounting embodies the most advantageous features of my former construction, such as providing a low resting and comfortable fitting bridge piece with detachable studs for the lenses and adjustable spring pressed guards for the nose, whereby a wide range of adjustments may be had to meet practically every need and condition in making perfect fittings. In addition, my improvement is particularly constructed with a view to simplicity and economy in the manufacture of its parts, rigidity and security of the parts when assembled, convenience and accessibility in attaching or detaching the parts, and durability and sightliness when the mounting is assembled and in use.

In the accompanying drawings, Figure 1 is a front view of my improved mounting with one lens attached and with the fragmentary part of another lens detached, and showing other parts of the mounting in elevation and section as detached and grouped together. Fig. 2 is a plan or edge view of the mounting from the top, showing one lens and its stud in section and one guard member omitted. Fig. 3 is a perspective view of the bridge piece. Fig. 4 is a sectional view and inner elevation of the mounting on line 4 4, Fig. 1. Fig. 5 is a perspective view of the lens clamping stud. Fig. 6 is a cross section of one of the bridge piece arms on line *x—x*, Fig. 3.

The mounting comprises a so-called low bridge piece 2 having forwardly extending portions 3 rigidly united with its base or arch ends and preferably integral therewith or made in one piece. As worn, the arch or main body of bridge piece 2 is inclined in respect to extensions 3, and the ends of said extensions and the middle or high point of the arch are approximately opposite each other or in the same vertical plane. The stock from which the bridge piece is made may be either flat, oval or round, but the arms or extensions 3 are preferably flat and provided with circular enlargements or eye ends 4 having countersunk openings 6 adapted to receive fastening screws 7 for clamping studs 8 of lenses 9. Extensions 3 carry the lenses forwardly of the base ends of the arch of bridge piece 2 so that the plane of the inside faces of the lenses will approximately bisect the inner edge of the arch at its top or highest point where it rests flat upon the nose, thus properly positioning the lenses in respect to the eyes and eyelashes in most cases. The weight of the glasses is also thereby centered or balanced and the mounting will seat naturally without shift or tilt on the nose and thus in a measure minimize tension or strain on the guards 10.

Clamping studs 8 are constructed as usual with bifurcated parts 11 to engage the lens by screws 12. However, the heads 13 of studs 8 which are integrally connected with parts 11 by shank 14 are new and novel in that each head is adapted to socket the eye ends 4 of extensions 3. Thus each stud end or head 13 is provided with a circular seat or opening 15 and has a screw threaded bore centrally thereof into which screw 7 enters. The circular enlargements or eye ends 4 of extensions 3 fit tightly and snugly within the sockets or seats 15 and one side of heads 13 have slots or recesses 16 through which the intermediate portions of arms or extensions 3 project and in which they also tightly fit to prevent turning of the studs and lenses on the axis of screws 7. If desired, said extensions may be slightly beveled at their top and bottom edges, see Fig. 6, to make a wedging fit, and the edges of circular ends 4 may also be slightly beveled to seat within tapering openings 15 in heads 13, see Fig. 1. When the said ends 4 are seated their exposed faces are flush with the end edges of the circular flanges of heads 13. This smooth facial surface and rounded head 13 prevents scratching or injury to the nose and contributes materially to the comfort of the wearer of the eyeglasses.

Guards 10 comprise an open body of skeleton formation substantially as shown but may be otherwise constructed, and each guard has a flat arm 17 integral therewith which is bent laterally at its junction with the body 10 and then downwardly and then forwardly on a horizontal plane to any given length. The extreme end 18 of each arm 17 is curled or rolled upon itself in one or more coils which may be opened or closed as any given adjustment of the lenses to the mounting may require. Thus by substituting different forms of studs 8, such as an offset stud for a straight stud, the lenses may be carried outward or inward in respect to the eyes and eyelashes. A corresponding change or adjustment in the guard, especially at its finger operating end, is obtained by coiling or uncoiling ends 18 to shorten or lengthen arm 17 so that the fingers may properly grip and operate the guard in placing the eye glasses upon the nose and in removing them. To further this purpose, guards 10 are therefore pivotally mounted on vertical screws 19 removably mounted upon lateral ears 20 integral or soldered to the outside of bridge piece 2 at the base ends thereof substantially in line with ends 4 although preferably slightly above the same so that arm 17 may swing freely over heads 13 of studs 8. Each guard 10 is also spring controlled, coiled springs 21 being provided and held in place by the pivot pins or screws 19. One end of each spring 21 engages the guard and the other end a part of the bridge piece, in this instance, a vertical post 22 integral with each ear 19.

In making a fitting, longer or shorter studs 8 may be used to set the lenses for any given interpupilary distance, or studs of angular formation may be employed to set the lenses inward or outward as described. These changes are permissible only because the studs are detachably secured to the mounting. No substitution or removal of the guards is necessary because arm 17 may be lengthened or shortened to meet changes in position of the lenses, and because the main body 10 may be variously set at different angles, raised higher or lower, or moved inward and outward in respect to the bridge piece by reason of the bendable arm 17 at corners 23 and 24, see Figs. 2 and 4. However, guards 10 may be readily removed or new springs 21 may be substituted for old or broken ones by removing screws 19.

What I claim is:

1. An eye-glass mounting comprising an arched bridge piece having straight base extensions inclined in respect thereto and projecting forwardly to a point approximately in a vertical plane with the highest point of the arch, and said extensions having perforated extremities of circular formation disposed flatwise in a vertical plane, and lateral ears integral with said bridge piece at its base extensions and posts integral with said ears, in combination with supporting members for the lenses, means to detachably secure the same to said perforated extremities, and nose guards pivotally mounted upon said ears and laterally movable within the limits defined by said posts and the base of said bridge piece.

2. In eye-glass mountings, a bridge piece comprising an arched body having straight base extensions inclined in respect thereto and projecting forwardly thereof and having enlarged and flattened eye ends disposed in parallel vertical planes, and ears laterally extending from said bridge piece having integral posts, said ends and ears having openings therethrough, in combination with finger pieces pivotally mounted on said ears.

3. In eye-glasses, a bridge piece comprising an inclined arched body having flattened circular ended base extensions projecting forwardly on parallel horizontal lines and with the flat extensions disposed in parallel vertical planes and provided with lateral ears at its sides and vertical posts thereon adapted to support nose guards, in combination with clamping studs for the lenses having circular socket portions adapted to seat the circular ends of said base extensions, means to detachably secure said studs and extensions together, lenses removably secured upon said studs, guards pivotally supported upon said lateral ears between the bridge piece base and said posts, and springs to control said guards.

In testimony whereof I affix my signature in presence of two witnesses.

GEORGE A. SQUIER.

Witnesses:
R. B. MOSER,
F. C. MUSSUN.